United States Patent

[11] 3,633,681

| [72] | Inventor | Richard Sipala<br>Huntington Station, N.Y. |
| --- | --- | --- |
| [21] | Appl. No. | 869,064 |
| [22] | Filed | Oct. 24, 1969 |
| [45] | Patented | Jan. 11, 1972 |
| [73] | Assignee | Dapa Research Corp.<br>New York, N.Y. |

[54] ROTARY-ACTUATED SPADE
8 Claims, 10 Drawing Figs.

[52] U.S. Cl..................................................... 172/546,
172/518, 172/540
[51] Int. Cl............................................................ A01b 21/02
[50] Field of Search............................................ 172/49, 31,
38, 95, 524, 518, 541, 546, 551

[56] References Cited
UNITED STATES PATENTS
1,272,231   7/1918   Davis et al.................... 172/541

| 2,306,744 | 12/1942 | Morkoski..................... | 172/321 |
| 2,487,158 | 11/1949 | Mason........................... | 172/546 |
| 2,700,926 | 2/1955 | Goit............................... | 172/541 |

*Primary Examiner*—Edgar S. Burr
*Assistant Examiner*—R. T. Rader
*Attorney*—Sandoe, Hopgood and Calimafde ABSTRACT: A plurality of small holes are formed for mass shrub planting by an implement pulled by a tractor. The implement comprises a wheel having a plurality of spaced, biased spadelike implements. As the wheel rotates, the spade is forced into the ground, the spade has a lever attachment which strikes a stationary cam holding the spade in position, but after the wheel rotates for a certain distance, the lever end falls below the cam, and the spade is released. The dirt which is held in the spade is then released to ground, partially or completely filling the hole.

PATENTED JAN 11 1972

INVENTOR.
RICHARD SIPALA
BY
Sandoe, Hopgood & Calimafde
ATTORNEYS

INVENTOR.
RICHARD SIPALA
BY
Sandoe, Hopgood & Calimafde
ATTORNEYS

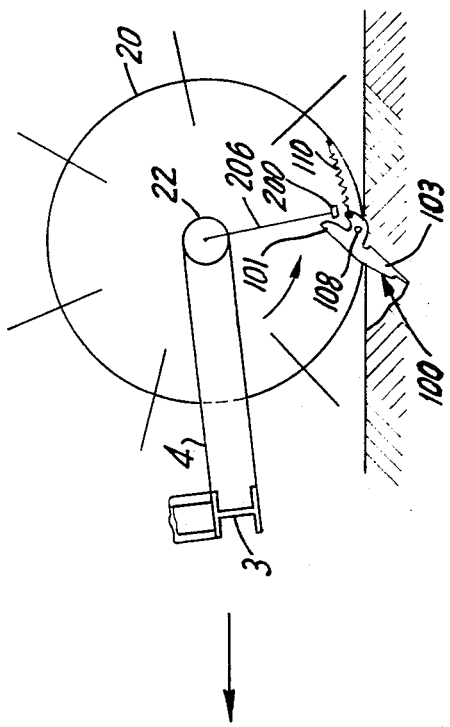
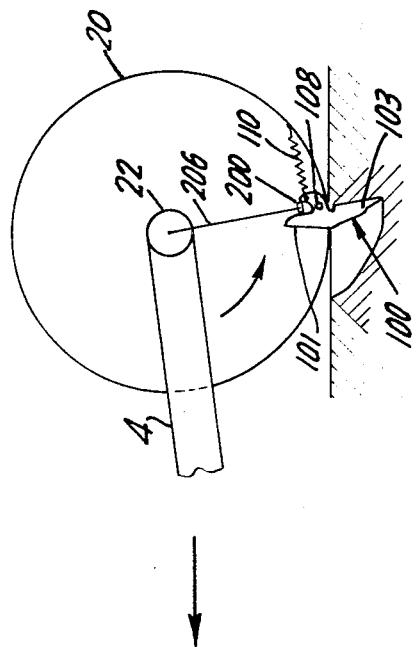
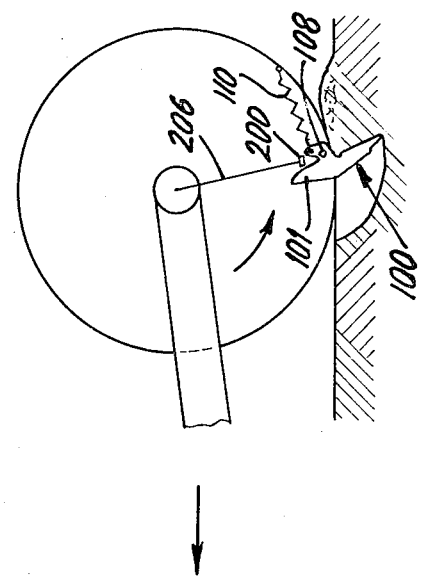
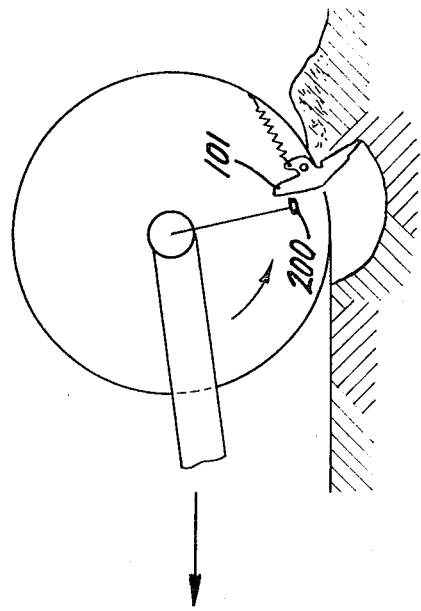

ROTARY-ACTUATED SPADE

My invention relates to a rotary-actuated spade for use in connection with digging relatively small holes for mass shrub planting.

This application is related to Ser. No. 768,386 entitled "-Multiple Plant or Shrubbery Hole Producing Apparatus," filed Oct. 3, 1968, in the name of Joseph F. Alberto.

In current mass highway-building systems, many problems arise in connection with the beautification and maintenance of the adjacent roadsides. Grass is difficult to maintain as well as expensive to lay and the presence of weeds is obviously detrimental.

Therefore, as part of the building and maintenance of highways, efforts have been made to plant a variety of shrubs and ground coverings in adjacent roadsides. My invention is particularly related to the problem of economically planting a variety of ground-covering plants, such as honeysuckles, ivy, etc. The means employed relates to the digging of holes automatically by a rotary-driven spade. The particular shrub to be planted is, of course, optional with the professional landscaper.

Such landscaping programs may require the planting of literally millions of shrubs in a short period of time, but over long stretches of highway.

One of the basic problems in terms of the economics of highway landscaping generally, and specifically the planting of the shrubs, relates to the formation of the hole in which the shrub is to be planted. The earth is ordinarily relatively hard and therefore considerable time is spent in manual digging.

In addition to problems relating to the speed at which the hole is formed, the length of time that the hole can be maintained is important, since it is generally uneconomical to dig and plant at the same time.

The number and types of shrubs and their ready availability present substantial problems considering the overall length of highway and the number of nearby locations where these large number of shrubs can be stored. The problem may be considered as one of logistics in which every effort is made to rapidly make the hole consistent with the number of shrubs that can be available. If a substantial number of holes are formed in a relatively short period of time, then such holes, if they cannot be maintained, will not be of significant use as the number of shrubs cannot be brought in and planted at the same rate.

It is therefore an object of my invention to provide an economical means of forming a hole which is usable for a relatively long period of time.

Yet another object of this invention is to provide a rotary-actuated spade means for forming a plurality of holes in which the dirt of the hole is dropped in place or dropped adjacent to the hole in a relatively soft position.

Yet another object of this invention is to provide a mechanism for digging the hole, and automatically releasing the dirt in place or relatively close to the hole by means of a biased spade implement.

Yet another and still further object of the invention is to provide rotary spades on a wheel drawn by a tractor, which spades are spring biased so that the dirt is dug by the spade while the spring is extended, but in which the spring is released in predetermined positions relatively close to the hole to allow the dirt to drop in predetermined locations in, or closely adjacent to the hole.

Through the use of my invention 30,000 to 40,000 holes can be made by one man in one day. This is a substantial number of holes that is greatly in excess of the number of shrubs which can ordinarily be planted by one man. In providing a means for making such large number of holes and providing means for depositing the dirt from the holes in a relatively useful position, considerable manpower is therefore released and made available for the actual planting of the shrubs themselves, thereby achieving substantial economics.

Briefly, this invention relates to a device for digging relatively small holes for mass shrub planting. Immediately after the hole is dug, the earth is allowed to remain in place loose in the hole as formed or relatively close to the hole. The earth is soft and therefore can easily be removed thereafter by workers who plant the shrubs. The implement comprises a wheel pulled by a tractor having a plurality of spaced spade like implements. As the wheel rotates, the spade is forced into the ground. Each spade element is pivotally attached at the periphery of the wheel at a pivot point. As the wheel is rotated, the spade is held rigid and enters the ground to begin digging the hole. Each spade has an associated biasing spring and a fixed member or cam extending from the stationary wheel shaft and held stationary in place. The spade has an extending section or part which constitutes the lever. As the wheel rotates, the lever strikes the cam and the spade is held rigid. The spade enters the dirt while it is held rigid and the dirt is lifted from the ground. As the wheel rotates, the lever, while holding the spade stationary, moves radially or downwardly so the tip end of the lever becomes closer and closer to the position of the cam and when the wheel reaches a certain position, the lever passes below the cam and the spring pulls the lever forward to release the dirt.

The cam can be set and positioned so that half a hole is dug, a full hole is dug, or the dirt can be released in the hole or adjacent to the hole.

The above-mentioned and other features and objects of this invention and the manner of attaining them will become more apparent and the invention itself will be best understood by reference to the following description of embodiments of the invention taken in conjunction with the accompanying drawings, in which:

FIGS. 7a–7d are a series of diagrams illustrating successive steps in the hole-forming sequence.

Figure 1:
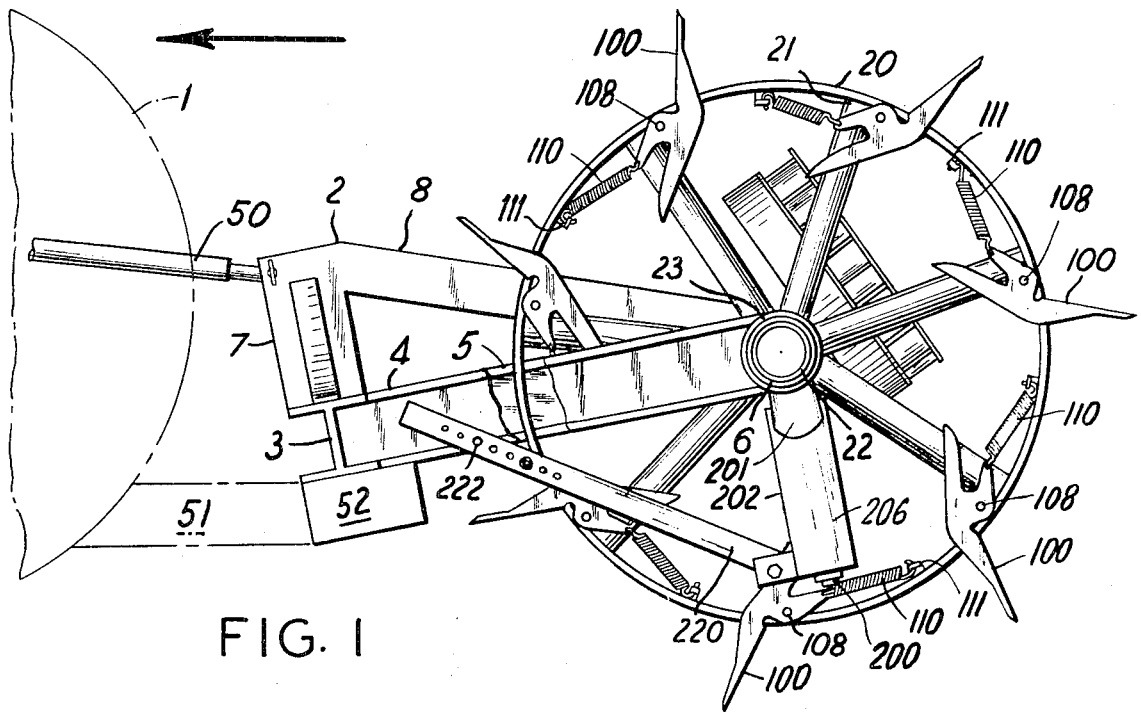
FIG. 1 is a front view illustrating a tractor pulling my rotary-actuated spade.

Referring to FIG. 1, there is shown a tractor 1 coupled to a rigid, trusslike coupling frame 2 which pulls the spade wheels 20, 20a (FIG. 2) and, when acted upon by cylinder 50 is rotated about a pivot coupling means 52 rigidly fastened by bar 51 to the tractor. Frame 2 has a generally triangular-shaped vertical cross section, and comprises horizontal I-beam 3, two I-beams 4 and 5 which connect at opposite ends of I-beam 3 and are attached to sleeves 6 on opposite sides of wheels 20, 20a to rotatably support a cylindrical shaft member, such as pipe 22.

Figure 5:
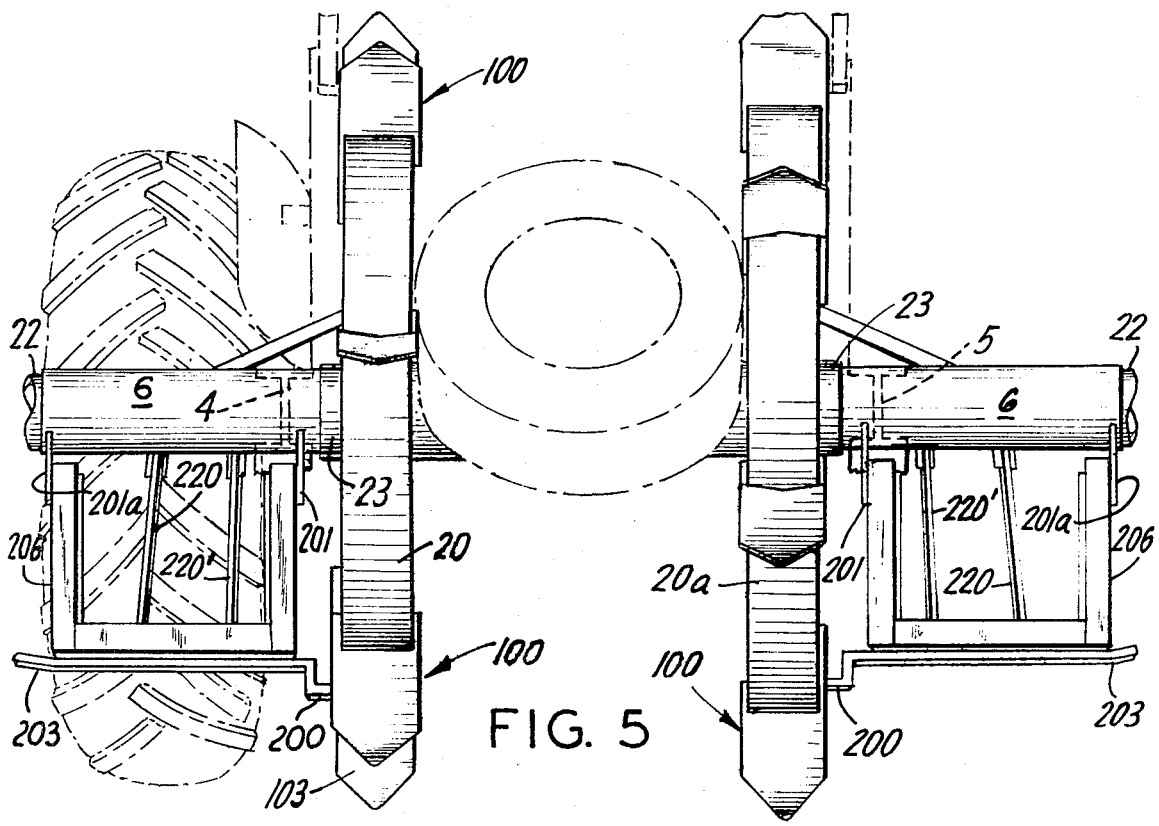
FIG. 5 is a side view illustrating the relationship between the actuating cam and the spade implement.

Depending from sleeve 6 is an adjustable cam, the purpose of which is to control the release of the spade elements as will be apparent later. The adjustable cam includes brackets 201, 201a (FIG. 5) depending from sleeve 6 to which is welded a cam frame comprising a substantially vertical U-shaped bracket 206. At the bottom of bracket 206, a bar 203 is welded having a cam striking surface or end 200 extending inwardly towards the wheel and away from side 202 of bracket 206 and positioned in the path of rotation of the extending lever end 101 of the spade 100.

The bracket 206 ordinarily pivots about sleeve 6, but is held rigid by a bar 220 or bars 220' (FIGS. 1, 5) having a plurality of bolt openings for adjustable and rigid coupling to the respective horizontal members 4, 5 of the coupling frame. Adjustment of bar 220 adjusts the vertical position of cam surface 200.

Cam surface 200, which is generally L shaped, has an operative portion, that is, the horizontal arm, which extends inwardly to interfere with the path of rotation of the extending end or lever end 101 of spade 110.

Figure 2:
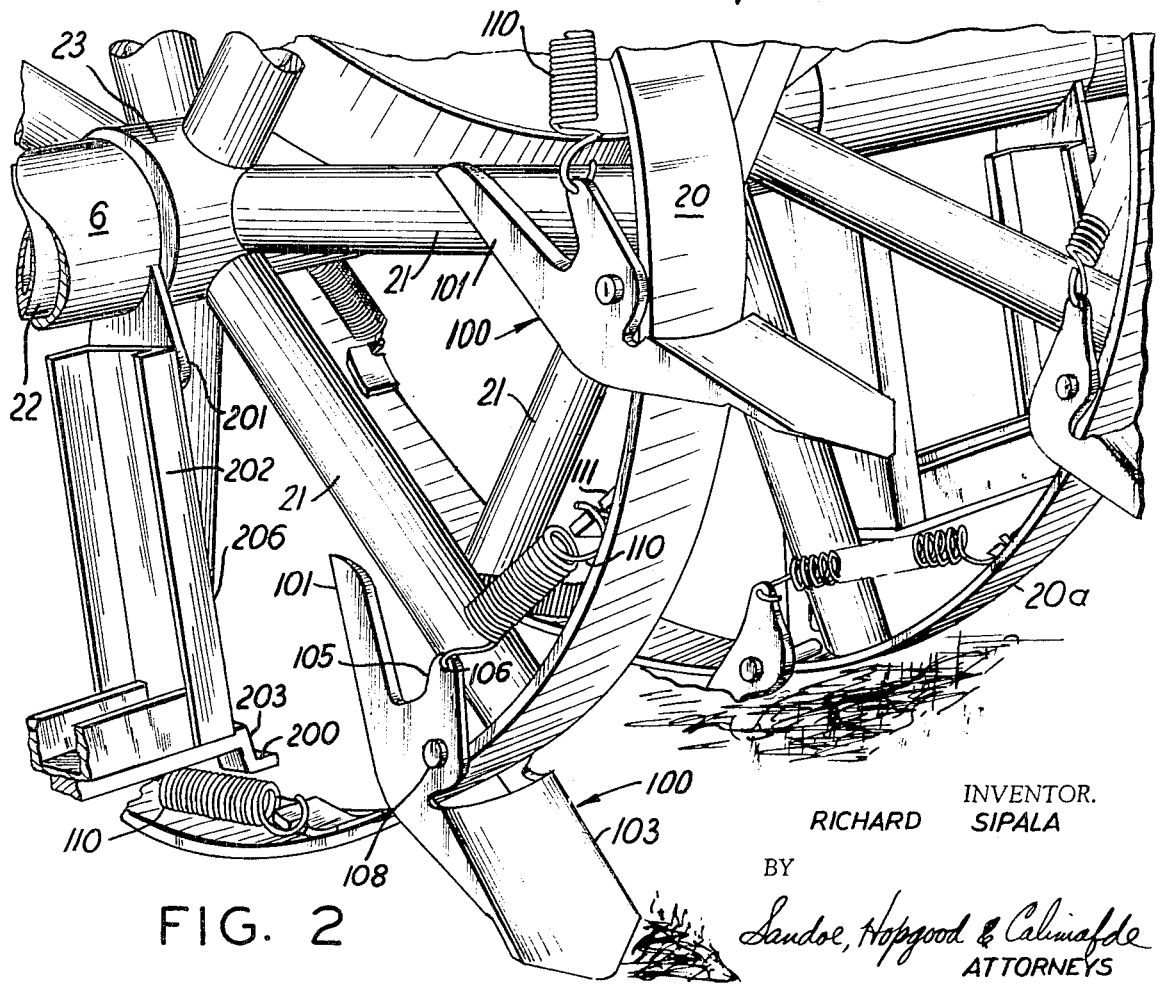
FIG. 2 is a perspective view illustrating various positions of the spade elements.
Figure 3:
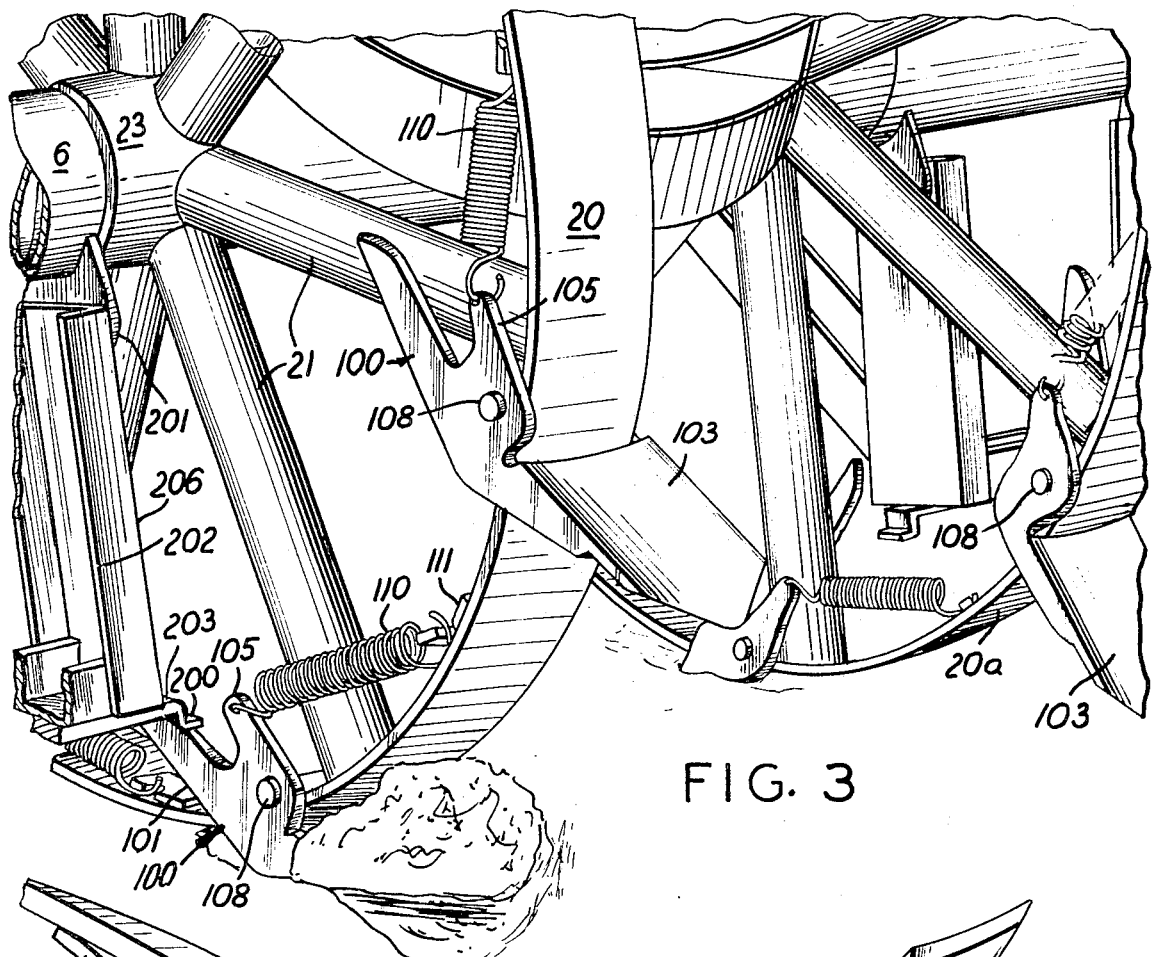
FIG. 3 is a view similar to FIG. 2 showing the spade element in an advanced position.
Figure 4:
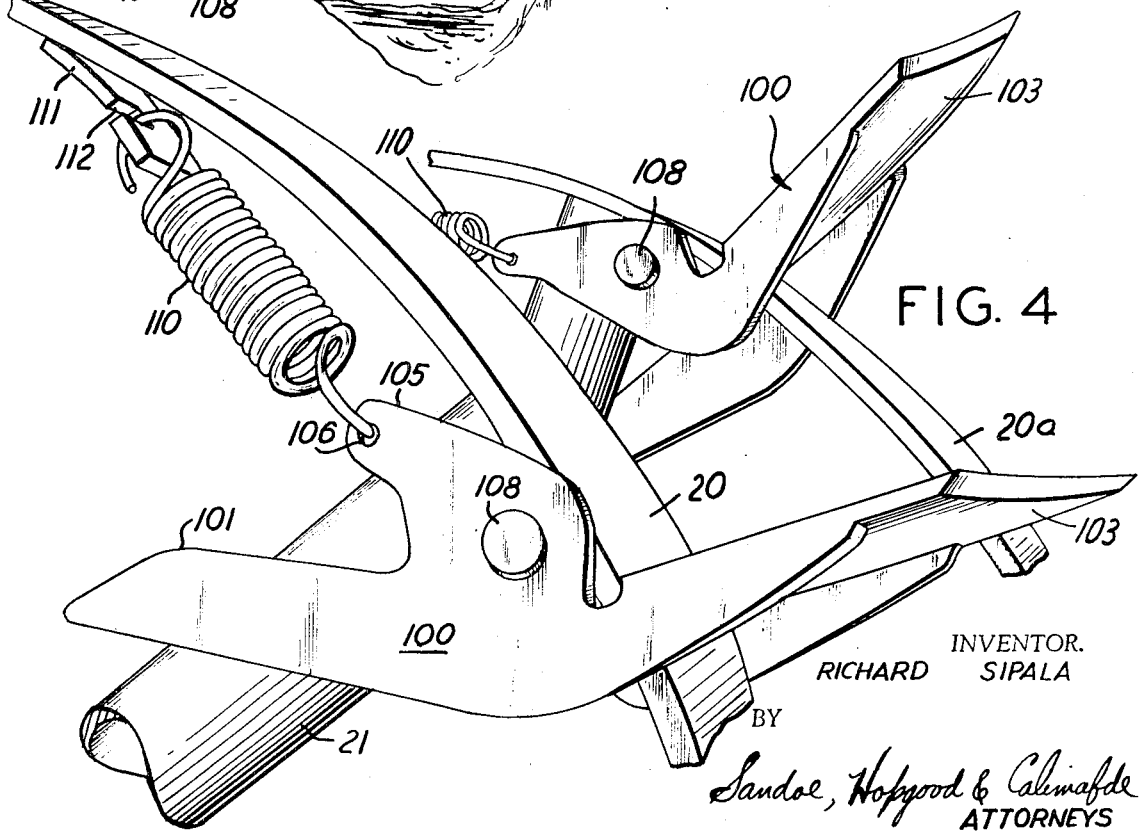
FIG. 4 is an enlarged view of the spade element and the biasing and lever elements attached thereto.
Figure 6:
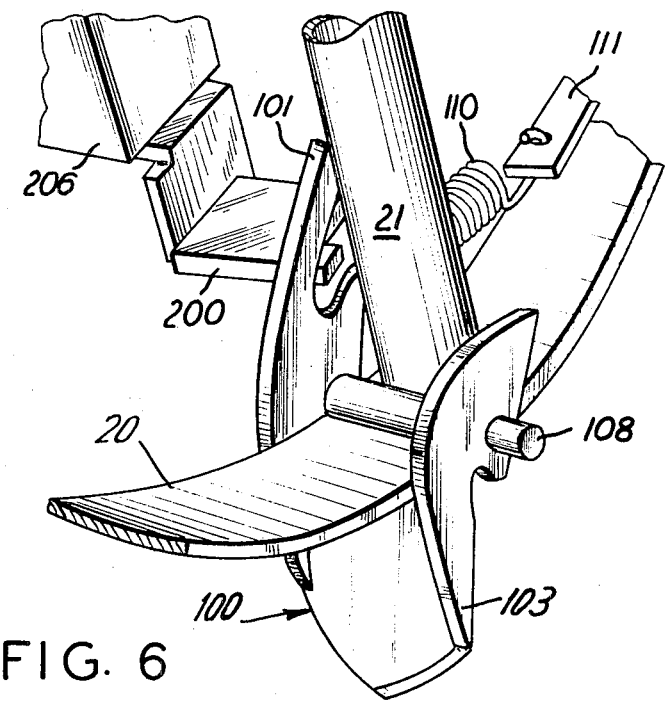
FIG. 6 is an enlarged view illustrating the cam lever engaging relationship.

Referring now to FIGS. 2, 3 and 6, as well as the other figures, there is shown a spade 100 having a front digging surface 103, a radially extending end or lever end 101 and an off-centered section or finger 105 having an aperture 106 to receive one end of a spring 110 which provides the biasing force. Spade 100 is pivotally secured to pin 108 as illustrated clearly in FIG. 6. Pin 108 is secured to the inside arm of the wheel 20 by welding or the like in a receiving groove. Pin 108 therefore exerts the driving force of the spade. A bracket 111 is secured to the inner surface of wheel 20 and spaced from pin 108 in the direction of forward movement of the wheel. Bracket 111 has an aperture 112 to receive the other end of the spring 110. In general, the shape of the lever resembles a Y, the common point being the pin 108 around which the whole structure pivots. While the spring is applied at an off-centered position, it is only necessary that the restoring force be applied above the pin, that is, radially, inwardly from the perimeter of the wheel. As illustrated in FIG. 6, the lever end is positioned so as to interfere with the cam-striking surface 200.

While the description of the spade element and the spring-biasing structure has been explained in detail, as illustrated in FIGS. 2 and 6, it will be understood that all of the spade elements are similar and employ similar actuating methods and biasing structures, except that only a single stationary cam 200 is employed for each wheel. The operation of the system may best be understood by referring to FIGS. 7a through 7d which show diagrammatically the mechanical forces operating upon the spade element.

It will be noted that the cam 200 is positioned somewhere between the 5 and 6 o'clock position with respect to the circle defined by the wheel. As the spade 100 reaches approximately the 7 o'clock position, it begins to form the hole. While the dirt offers some resistance to the spade movement, still there is sufficient force applied to the spade face 103 to form the hole portion as illustrated in FIG. 7a. Pin 108 as well as spring 110 provide the necessary force. When the spade reaches the position of the cam 200, the lever end abuts the cam 200 and is held in that position, except for downward sliding motion as the wheel and pin 108 progress. When the wheel and pin 108 progress beyond the point at which the top end of the lever end 101 of the blades 100 abuts the cam surface 200, the spring pulls the lever forward causing the dirt to be released.

While the foregoing description sets forth the principles of the invention in connection with specific apparatus, it is to be understood that this description is made only by way of example and not as a limitation of the scope of the invention as set forth in the objects thereof and in the accompanying claims.

What is claimed is:

1. An implement for producing in relatively large quantities a plurality of holes comprising:
 a coupling frame adapted to be pulled by a tractor,
 a shaft,
 a wheel mounted on said shaft and carried by said coupling frame a plurality of spade elements rotatably secured to the periphery of said wheel,
 each of said spade elements having an extending leverlike attachment,
 biasing means for attaching said lever attachment to said wheel,
 and means spaced between the wheel center and the wheel rim and adapted to bear against said lever attachment of said spade element,
 said cam means comprising a radial cam bracket pivotally mounted on said shaft, an adjusting rod secured at one end to said cam bracket and adjustably coupled at its other end to said frame, and a cam element secured to the end of said cam bracket,
 said cam element being positioned so that said lever attachment holds said spade element rigid for digging until such time as the lever passes below said cam element, said biasing means returning said lever to normal and causing the dirt held by said spade element to fall into position.

2. The implement of claim 1, further comprising:
 pivot means including hydraulic control means, whereby the tractor operator can cause pivotal up and down motion of said coupling frame.

3. The implement of claim 2, in which said coupling frame includes,
 at least two horizontal members coupled to said shaft to support said shaft but allow rotation and two rigid members coupled to said horizontal members to form a rigid triangular or trusslike section.

4. The implement of claim 1 in which said cam bracket is a generally U-shaped element, the upper ends of which are pivotally coupled to said shaft.

5. The implement of claim 4 in which said cam element is generally L shaped, the horizontal arm forming the cam striking surface.

6. The implement of claim 1 in which the biasing means is attached to the leverlike attachment radially, inwardly, the biasing force being in the direction of wheel rotation.

7. The implement of claim 6 including a bracket fixed to the inner surface of the wheel forwardly, in the direction of wheel rotation, to support the biasing means.

8. The implement of claim 5 in which the biasing means includes a bracket structure attached to the inner surface of the wheel in the direction of wheel rotation, said biasing means being attached to the bracket and the lever radially, inwardly of said wheel, said lever end having a cam surface which is generally straight but curves at the very top to provide little restoring force at the very top part thereof, means to adjustably position the position of the cam surface with respect to the angle of entry of the spade into the dirt.

* * * * *